(12) United States Patent
Hjelmström et al.

(10) Patent No.: US 9,936,112 B2
(45) Date of Patent: Apr. 3, 2018

(54) MONITORING CAMERA

(71) Applicant: AXIS AB, Lund (SE)

(72) Inventors: Jonas Hjelmström, Staffanstorp (SE); Stefan Lundberg, Lund (SE); Andreas Karlsson Jägerman, Södra Sandby (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/064,045

(22) Filed: Mar. 8, 2016

(65) Prior Publication Data

US 2016/0301836 A1   Oct. 13, 2016

(30) Foreign Application Priority Data

Apr. 8, 2015  (EP) .................................... 15162766

(51) Int. Cl.
| | | |
|---|---|---|
| H04N 5/225 | (2006.01) | |
| H04N 5/232 | (2006.01) | |
| H04N 5/272 | (2006.01) | |
| H04N 7/18 | (2006.01) | |
| G08B 13/196 | (2006.01) | |

(52) U.S. Cl.
CPC ..... *H04N 5/2254* (2013.01); *G08B 13/19628* (2013.01); *H04N 5/2253* (2013.01); *H04N 5/23238* (2013.01); *H04N 5/23267* (2013.01); *H04N 5/272* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 4,288,819 A | | 9/1981 | Williams |
| 6,734,911 B1* | | 5/2004 | Lyons ..................... G01S 3/781 |
| | | | 348/169 |
| 6,977,676 B1 | | 12/2005 | Sato et al. |
| 2001/0028730 A1* | | 10/2001 | Nahata ............... G06K 9/00597 |
| | | | 382/117 |
| 2005/0167774 A1* | | 8/2005 | Rhodes ............. H01L 27/14603 |
| | | | 257/443 |
| 2006/0028548 A1* | | 2/2006 | Salivar ............. G08B 13/19643 |
| | | | 348/143 |
| 2008/0151041 A1* | | 6/2008 | Shafer ................ A61B 1/00193 |
| | | | 348/45 |
| 2009/0047995 A1 | | 2/2009 | Futter et al. |

(Continued)

FOREIGN PATENT DOCUMENTS

| | | |
|---|---|---|
| CN | 101779445 A | 7/2010 |
| CN | 203324582 U | 12/2013 |

(Continued)

OTHER PUBLICATIONS

Chinese Office Action for Chinese Patent Application No. 201610157777.8 dated Aug. 14, 2017.

*Primary Examiner* — Christopher S Kelley
*Assistant Examiner* — Kaitlin A Retallick
(74) *Attorney, Agent, or Firm* — Volpe and Koenig, P.C.

(57) ABSTRACT

The present application relates to a camera where a non-wide-angle lens and a wide-angle lens projects images onto different regions of one and the same image sensor. The non-wide-angle lens images a part of a periphery of the wide-angle lens image, and in this way an overview image with an improved quality peripheral region can be achieved.

16 Claims, 6 Drawing Sheets

(56) References Cited

U.S. PATENT DOCUMENTS

| | | | |
|---|---|---|---|
| 2009/0059006 A1* | 3/2009 | Hattori | B60R 1/00 348/148 |
| 2010/0245539 A1* | 9/2010 | Lin | H04N 5/2258 348/36 |
| 2013/0155230 A1* | 6/2013 | Boketoft | H04N 5/232 348/143 |
| 2013/0242061 A1* | 9/2013 | Tsai | G03B 35/10 348/49 |
| 2015/0042851 A1 | 2/2015 | Ma et al. | |

FOREIGN PATENT DOCUMENTS

| | | |
|---|---|---|
| CN | 104349027 A | 2/2015 |
| EP | 2045512 A1 | 4/2009 |
| JP | 2000341574 A | 12/2000 |

\* cited by examiner

MONITORING CAMERA

CROSS REFERENCE TO RELATED APPLICATION

This application claims the benefit of European Patent Application No. 15162766.8 filed on Apr. 8, 2015, which is incorporated by reference as if fully set forth.

FIELD OF INVENTION

The present invention relates to a camera for monitoring a scene.

BACKGROUND

Monitoring cameras are used in many different applications, both indoors and outdoors. For cost and efficiency reasons it is usually desirable to keep the number of cameras in an area as low as possible, meaning that large spaces are often to be covered using only a few devices. Wide-angle cameras are able to cover large areas and are therefore a popular choice in such situations. Such cameras are in most instances mounted in a ceiling or on a post facing downwards, giving a half-spherical field of view of 180°.

A downside of using wide-angle cameras is that details close to the perimeter of the camera view are difficult to perceive due to optical distortions and low resolution. This is due to the fact that the ratio of imaged area of the scene per pixel of the image sensor will increase with the distance from the center of the image. Therefore an operator viewing an image from a wide-angle camera may miss events taking place near the periphery of the wide-angle view, and, even if the event is detected, there are in many cases not sufficient detail in the peripheral area of the image for identification of an object or an event. Camera solutions which provide better image quality near the periphery of a wide-angle view are therefore of interest.

SUMMARY

In view of the above, it is thus an object of the present invention to provide a monitoring camera which improves the possibility to identify or recognize objects or events near the periphery of a wide-angle image.

In accordance with a first aspect of the invention a monitoring camera arranged to monitor a scene comprises an image processing unit and an image capturing unit, wherein the image processing unit is arranged to receive images from the image capturing unit, wherein the image capturing unit comprises a first, wide-angle lens arranged for imaging a first, panoramic view of the scene, a second, non-wide-angle lens, arranged for imaging a second view of the scene, wherein the second lens is mounted with its optical axis at a second angle to an optical axis of the first lens, such that the second view of the scene imaged by the second lens covers a first part of a peripheral portion of the first view, an image sensor, arranged to capture the first view imaged by the first lens, at a first end region, and arranged to capture a portion of the second view, at a second end region, a first optical element having a first reflective surface, wherein the first reflective surface is mounted at a first, acute angle to the optical axis of the second lens, and arranged to reflect the portion of the second view, and wherein the image sensor is mounted in a plane perpendicular to the optical axis of the first lens, or wherein the first reflective surface is mounted at a first, acute angle to the optical axis of the first lens, and arranged to reflect the first view, and wherein the image sensor is mounted in a plane perpendicular to the optical axis of the second lens.

By imaging a part of the periphery of the wide-angle view by the second lens, an improved image quality is achieved in this region, which makes the image from the camera more useful to an operator. Since both images are projected onto the same image sensor, unused resources in the form of image sensor pixels outside a normally circular wide-angle view are no longer wasted, and a compact and not very space-consuming device can be achieved. Since image sensors normally are produced in a rectangular format, an unused area outside the wide-angle image otherwise occurs. Additionally, by reflecting only a part of the second lens view, an even better image quality is achieved at the periphery of the panoramic view.

The first lens may be a fish-eye lens.

The second angle may be between 30° and 95°, and in particular be 90°, in order to conveniently allow the second lens view to cover a part of the periphery of the wide-angle view.

The first optical element may comprise at least one of a mirror and a prism. Both of these options will provide a reflection of the view from the second or first lens, respectively, onto the image sensor.

The first optical element may be arranged to separate the first end region from the second end region of the image sensor. As another option, the first optical element may be arranged at a first side of the image sensor. Both of these options provide a compact image capturing unit.

The image processing unit may be arranged to receive an image from the image sensor comprising both the first view captured from the first lens and the second view captured from the second lens, and add an overlay, to an image part representing the first view from the first lens, marking the part of the peripheral portion of the first view which is currently covered by the second lens. In this way it is easy for an operator viewing the image from the camera to understand which part of the periphery of the wide-angle view is covered by the detailed image from the second lens. This in turn improves user friendliness and makes it possible to provide an intuitive user interface.

The image capturing unit may be mounted on a rotatable base, such that the second lens is arranged to image different parts of the peripheral portion of the scene in different rotated positions of the base. The rotatable base may either be controlled via a motor, such as a step motor, or manually, and it may be possible to control the rotation of the base during use of the camera or only during setup.

The image processing unit may be arranged to perform a rotational transform of the image captured by the first end region of the image sensor, of the view imaged by the first lens, such that a rotation of the camera is compensated. In this way the wide-angle image from the first lens will stay still and not move on a monitor display, which makes the image easier to interpret for a user.

The monitoring camera may further comprise a first light absorbing wall separating the first end region and the second end region of the image sensor, wherein the first light absorbing wall is arranged to prevent light from the second lens from falling on the first end region of the image sensor. As an addition, or as an alternative, in combination with the variant where the first reflective surface is mounted at a first, acute angle to the optical axis of the second lens, and arranged to reflect a portion of the second view, and the image sensor is mounted in a plane perpendicular to the optical axis of the first lens, the monitoring camera may comprise a second light absorbing wall mounted at the first end region of the image sensor and enclosing an area of the image sensor capturing the first view imaged by the first lens, wherein the second light absorbing wall is arranged to prevent light from the second lens from entering the view imaged by the first lens at the image sensor. In this way the image quality of the view from the first lens is not impaired by stray light from the second lens.

In combination with the first reflective surface being mounted at a first, acute angle to the optical axis of the second lens, and arranged to reflect the portion of the second view, and the image sensor being mounted in a plane perpendicular to the optical axis of the first lens, the monitoring camera may comprise a third, non-wide-angle lens, arranged for imaging a third view of the scene, and a second optical element having a second reflective surface, wherein the second reflective surface is arranged at a third, acute angle to an optical axis of the third lens, and arranged to reflect a portion of the third view imaged by the third lens, wherein the image sensor is arranged to capture the reflected portion of the second view image, reflected by the first reflective surface, at a first part of the second end region, and to capture the reflected portion of the third view image, reflected by the second reflective surface, at a second part of the second end region, wherein the third lens is mounted with its optical axis at a fourth angle to the optical axis of the first lens, such that the third view of the scene imaged by the third lens covers a second part of a peripheral portion of the first view imaged by the first lens. By adding another non-wide-angle lens to the camera, it is possible to improve image quality and better view details in two different parts of the periphery of wide-angle image, which makes the camera even more useful to an operator.

The second lens and the third lens may be arranged at opposing sides of the image sensor. Additionally, the first optical element and the second optical element may be arranged between the first part and the second part of the second portion of the image sensor. In this way a compact construction may be achieved, and the pixels of the image sensor are used in an efficient manner.

A third light absorbing wall may be mounted between the first part and the second part of the second portion of the image sensor, and be arranged to prevent light from the second lens from entering the second part of the second portion of the image sensor, and to prevent light from the third lens from entering the first part of the second portion of the image sensor. This improves the image quality by stopping stray light from the second and third lens.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claims, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The invention will now be described in more detail by way of example and with reference to the accompanying schematic drawings, in which.

DETAILED DESCRIPTION OF THE PREFERRED EMBODIMENTS

Figure 1:
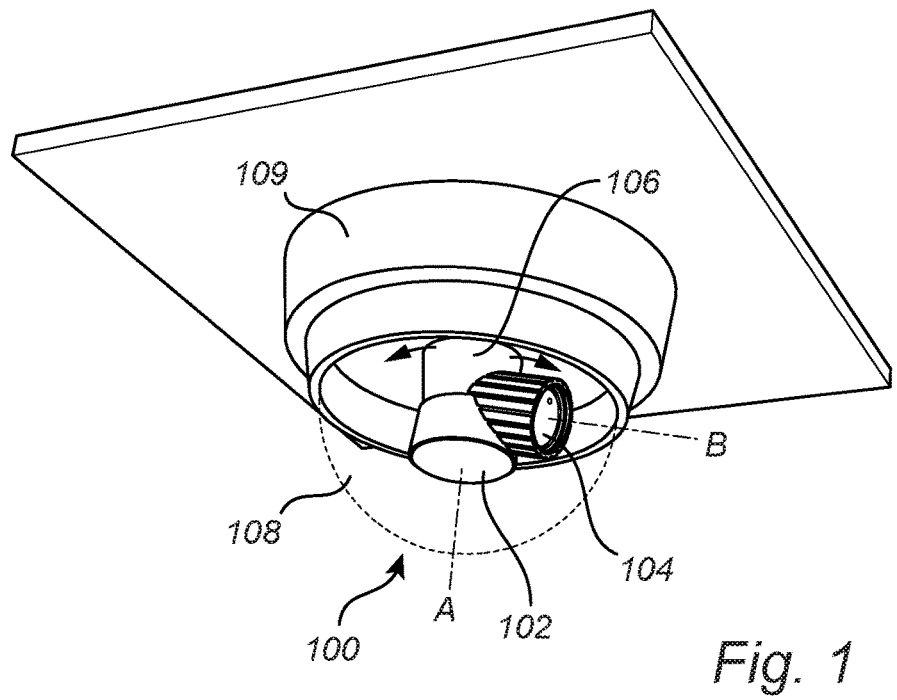
FIG. 1 shows a monitoring camera.

FIG. 1 shows a monitoring camera 100 which has a first, wide-angle lens 102 and a second, non-wide-angle lens 104. The second lens 104 is mounted next to the first lens 102, and both lenses depict, or image, a monitored scene. The first lens 102 images an overview, or a panoramic view of the scene, and the second lens 104 images a part of a peripheral portion of the view from the first lens 102. Both the first lens and the second lens may be equipped with automatic focus and iris control, and the second lens may also include a zoom lens, which may be manually adjusted or adjusted by a motor.

Expressed differently, the view angle of the first lens 102 is wider than the view angle of the second lens 104, and usually the view angle of the first lens 102 is substantially wider than the view angle of the second lens 104. A fish-eye lens is a common choice for the first lens 102. A fish-eye lens is an ultra-wide-angle lens with a field of view usually between 100° and 180°, which gives a wide panoramic or hemispherical image, with a characteristic convex, non-rectilinear appearance. Fish-eye lenses are commonly used when monitoring cameras need to provide overview images. Other choices of wide-angle lenses are also possible. The view angle of the first lens 102 is usually chosen in the neighborhood of 180°, even if it in principle also would be possible to use a view angle of less or more than 180°. In any case, the view angle of the first lens 102 is selected to provide a reasonable overview image of a scene monitored by the camera 100.

The optical axis A of the first lens 102 and the optical axis B of the second lens are not parallel; instead they are at such an angle to each other that it is possible for the second lens 104 to image a part of the periphery of the first lens view. The angle between the optical axis A of the first lens 102 and the optical axis B of the second lens 104 is usually near 90°, but, depending on e.g. the scene that is to be monitored by the camera 100, it can e.g. be between 30° and 90°. It would of course be possible to use a degree of more than 90° too, but usually that angle does not give much information of interest. In a scenario where the camera is mounted in a ceiling, a degree of more than 90° would mean that the second lens would mainly image the ceiling. At a degree of less than 30° the second lens would depict a part of the panoramic view where the first lens gives a non-distorted image with good resolution, where "help" is much less needed from the second lens image to detect objects.

The first lens 102 may be mounted so that it reaches down below the edge of the second lens 104, to make sure that the edge of the second lens is not part of the view from the first lens. This is especially useful if the first lens has a view angle of more than 180°.

Figure 2A:
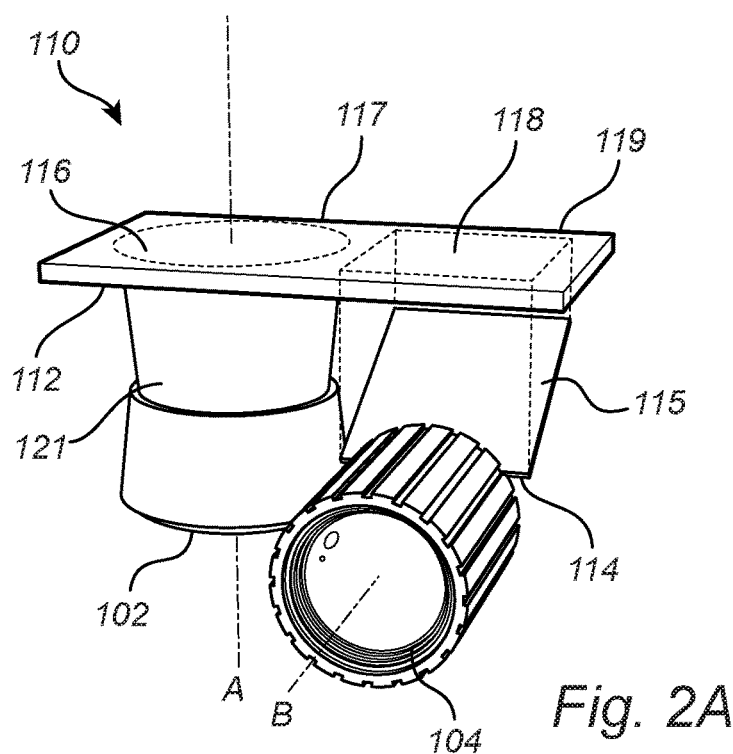
FIGS. 2A and 2B show image capturing units.
Figure 2B:
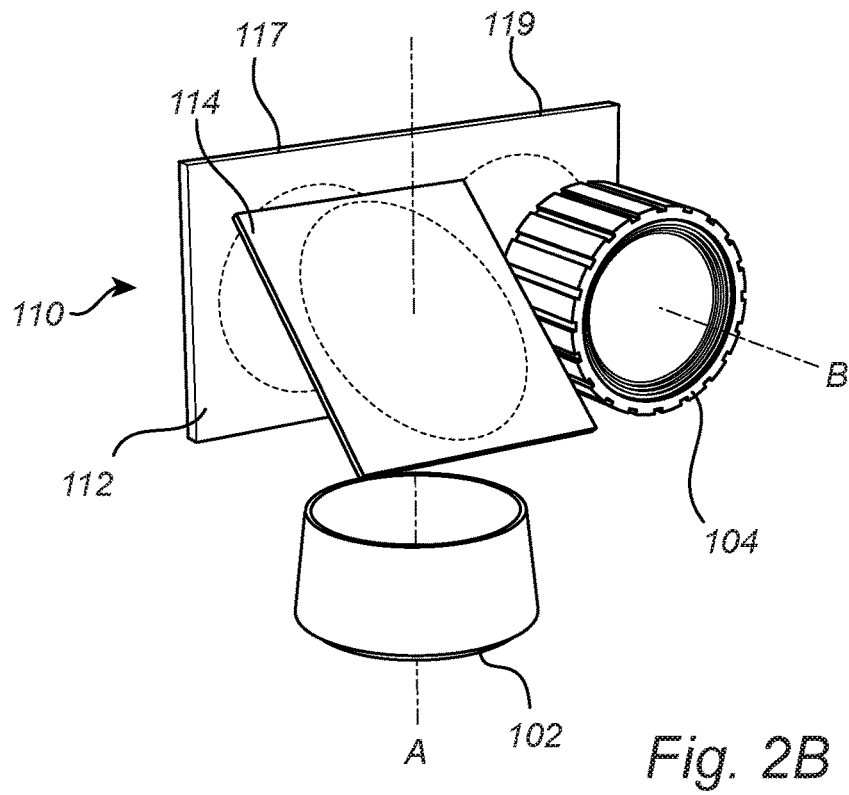

The first lens 102 and the second lens 104 both form part of an image capturing unit 110, which is illustrated in two variants in FIGS. 2A and 2B. The image capturing unit 110 is mounted on a rotatable base 106, and, as illustrated in FIG. 1, the camera often comprises a transparent dome glass 108 which protects the lenses and the base. As the rotatable base 106 rotates the image capturing unit 110, e.g. by a motor, such as a step motor, or by manual force when an operator is installing the camera 100, the second lens 104 will gradually image different parts of the periphery of the panoramic view. When using a dome glass, an option is also to let the second lens view the scene through an opening in the dome glass, in order to improve the image quality even further. In that case the dome glass would rotate along with the lenses.

The rotation by the motor may be controlled by a user, e.g. remotely by operating the camera 100 via a user interface on a workstation or a mobile device, or may be performed automatically in response to a detection of motion or an object. In the latter case, a detection of motion or an object in the panoramic view may trigger a rotation of the base 106 to a position where the second lens 104 is able to image the cause of the trigger.

During a rotation, the view from the first lens will rotate around its center, i.e. its optical axis, but this rotation can be conveniently countered by performing a rotational transform during the image processing of the image from the first lens. This rotational transform may be implemented in software or hardware, e.g. in the form of a scaler, rotating the captured image from first lens with the same rotation angle in the opposite direction, to counter the rotation of the base, in order to make the image from the first lens stay still when viewed by an operator in a graphical user interface.

The relationship between image coordinates in the view imaged by the first lens 102 and the view imaged by the second lens 104 is known, e.g. by manual calibration or by using image analysis mapping the pixels of an image from the second lens 104 to an image from the first lens 102. This mapping may e.g. be done during manufacturing or testing of the camera 100, or in a calibration step at the first use of the camera 100. In other words, it is usually pre-stored in the camera 100, which part of the periphery of the panoramic view is imaged by the second lens 104.

As mentioned above, the first lens 102 and the second lens 104 both form part of an image capturing unit 110, which is illustrated in two variants in FIGS. 2A and 2B. The projected view from the first lens is illustrated as being substantially circular since a fish-eye lens normally produces a circular image. The image sensor is rectangular, with a greater width than height, and is wider than the diameter of the view projected from the first lens.

In FIG. 2A the first lens 102 is mounted with its optical axis A perpendicular to an image sensor 112. The image capturing unit 110 also comprises a first optical element 114, which in turn may comprise e.g. a mirror or a prism. In any case, the first optical element 114 includes a reflective surface 115 which is arranged at an acute angle to the optical axis B of the second lens 104, and thereby reflects at least a portion of the view imaged by the second lens 104 onto the image sensor 112.

As is shown in FIG. 2A, the image sensor 112 is in this way able to capture both an image 116, of the panoramic view imaged by the first lens 102, at a first end region 117 of the image sensor 112, and an image 118 of the view imaged by the second lens 104 at a second end region 119 of the image sensor. In order not to receive any stray light or similar disturbance from the second lens onto the first end region, a light absorbing wall 121 is mounted at the first lens 102, enclosing the light from the first lens 102 falling on the first end region 117, forming the image 116 on the image sensor 112, and at the same time preventing light from the second lens to fall on the first end region 117.

The light absorbing wall 121 shown in FIG. 2A is circular or close to circular in order to enclose the view imaged by the first lens 102. As an alternative or additional solution it would also be possible to mount a non-circular light absorbing wall between the first end region 117 and the second end region 119 of the image sensor 112 for the same purpose of preventing stray light effects, primarily on the panoramic image. The latter option could also be combined with a variant of the image capturing unit where the second lens is placed along a short side of the image sensor, instead as in FIG. 2A, along a long side, and the optical element is then placed between the first end region 117 and the second end region 119. Additionally, the first optical element 114 and the non-circular light absorbing wall could be then combined in one element.

In FIG. 2B, a second variant of the image capturing unit 110 is shown. Here the second lens 104 is mounted with its optical axis B perpendicular to the image sensor 112. The reflective surface 115 of the first optical element 114 reflects the panoramic view from the first lens 102 onto the image sensor. Just as in the first variant, another option is to mount the first lens 102 along a short side of the image sensor 112 and place the first optical element 114 between the first and second end region of the image sensor. A light absorbing wall may in both cases be mounted between the first end region 117 and the second end region 119 of the image sensor 112, for the same purpose of preventing stray light effects, primarily on the panoramic image.

The image captured by the image capturing unit 110 is received by the image processing unit 109, which e.g. may be located inside the rotatable base 106, as indicated in FIG. 1. The image processing unit 109 may also be placed elsewhere in the camera 100, or at a shorter or longer distance from the camera 100. The image processing unit 109 may be provided wholly or partly as hardware designed especially for that purpose, or in the form of software run on a general purpose hardware, and it may also be provided partly in the camera and partly remote from the camera.

Figure 3A:
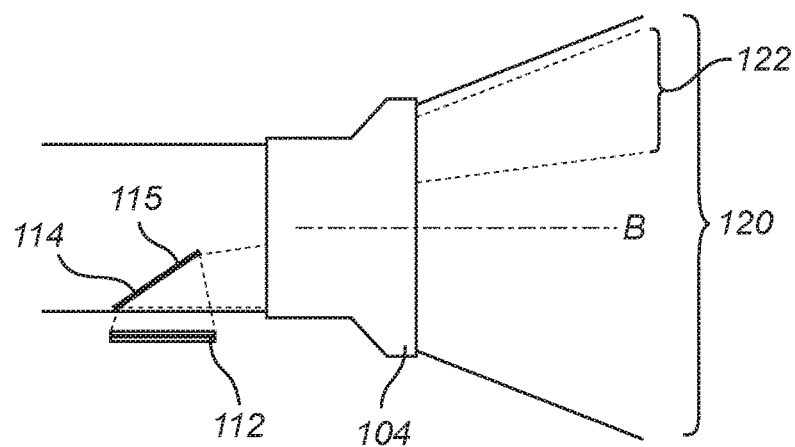
FIGS. 3A and 3B show parts of the image capturing units in more detail.

FIG. 3A shows how the view 120 imaged by the second lens 104 in FIG. 2A is reflected by the reflective surface 115 of the first optical element 114 onto the sensor 112. As indicated by the dashed lines in FIG. 3A, only a part 122 of the view 120 is reflected onto the image sensor 112. In this way, the image sensor 112 is able to capture an even more detailed view in the part 122.

Figure 3B:
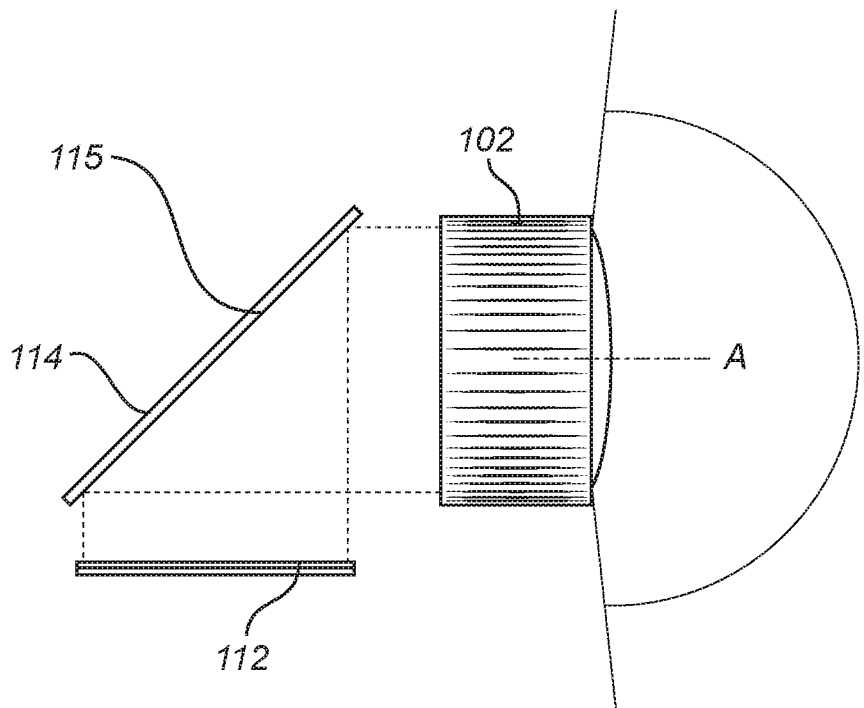

FIG. 3B shows how the panoramic view imaged by the wide-angle lens 102 in FIG. 2B is reflected by the reflective surface 115 of the first optical element 114 onto the sensor 112. In this variant, the entire panoramic view of the first lens 102 is normally reflected, not just a part of the view (as in the variant illustrated in FIG. 2A where the second lens view is reflected).

Figure 4:
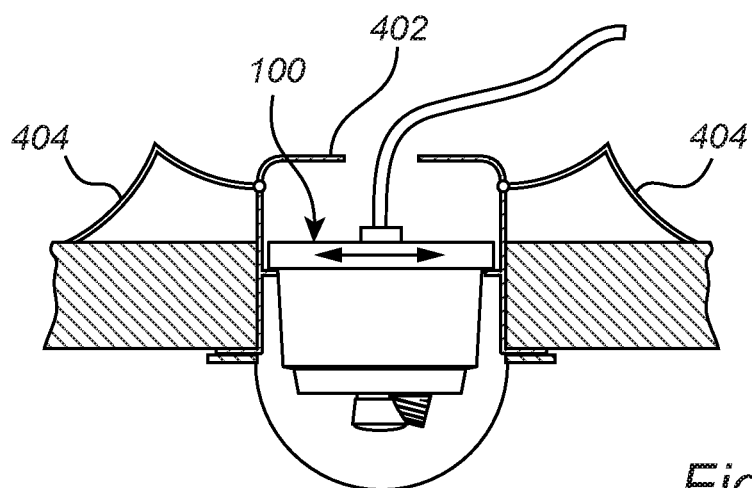
FIG. 4 shows an example of how the camera may be mounted in a ceiling.

FIG. 4 shows an example of how the camera 100 conveniently may be mounted in a ceiling 400. The camera is enclosed in a housing 402, similar to housings used for mounting spotlights. The housing 402 with the camera 100 may be attached to the ceiling 400 using spring-loaded clamps 404, e.g. in the manner described in applicant's patent EP2045512, which is incorporated by reference as if fully set forth.

Figure 5:
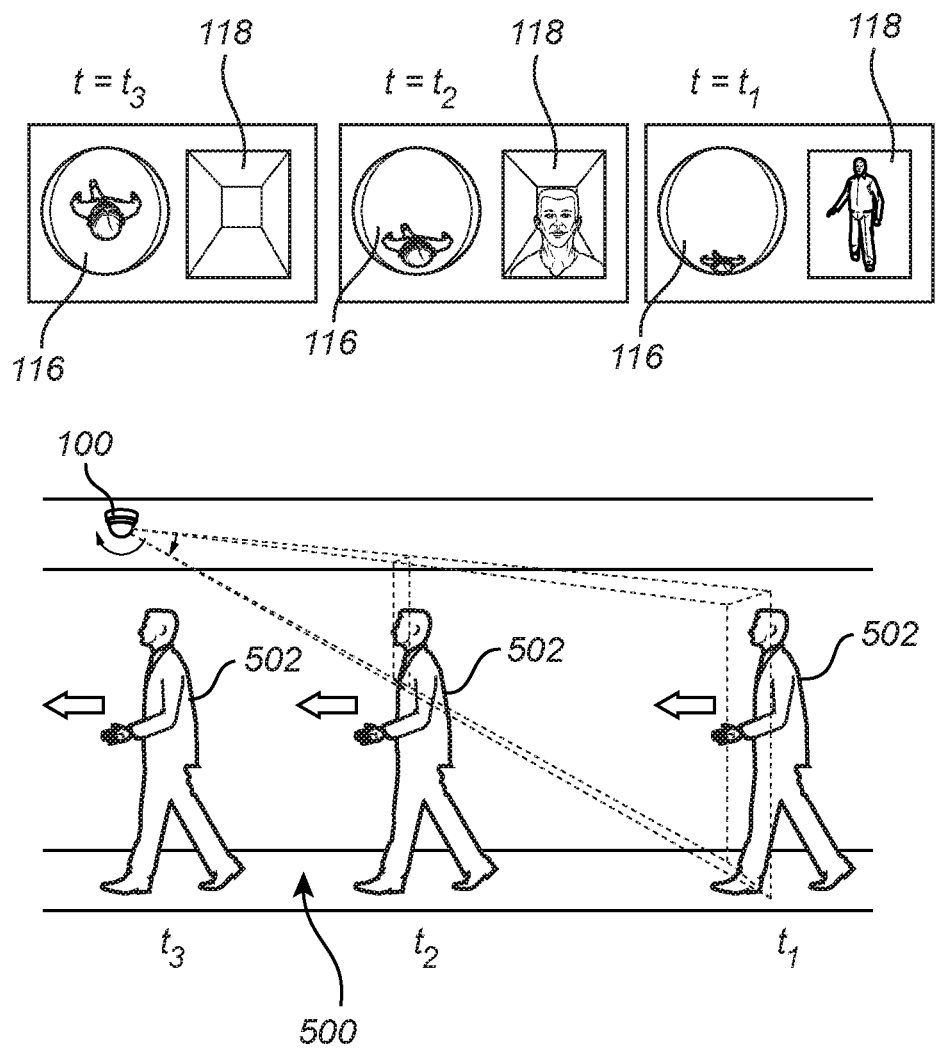
FIG. 5 illustrates a monitoring scenario.

FIG. 5 illustrates a typical scenario where the camera 100 is mounted in a ceiling and monitors a corridor 500 where an object 502 moves from the right end towards the left end, as indicated by the arrows, and in this process gradually approaches the camera 100. In the lower part of FIG. 5, the position of the object 502 is shown at three different time points, $t_1$, $t_2$ and $t_3$. In the upper part of FIG. 5, the images captured by the image sensor 110, at the different time points $t_1$, $t_2$ and $t_3$, are illustrated.

The image captured at time point $t_1$ illustrates how the object 502 at this distance from the camera is imaged in the periphery of the wide-angle view, which makes the object small and somewhat difficult to see (or identify) in the panoramic image 116. At the same time the image 118 from the second lens which depicts only this part of the periphery gives a large and clear view of the object.

At time point $t_2$, the object 502 has approached the camera 100, and here the second lens 104 is able to image the face of the object 502. The wide-angle image at the same time gives a larger view of the object since it has now moved more towards the center of the wide-angle lens view.

At time point $t_3$, the object is almost below the camera, and it is not imaged by the second lens any longer. However, this is not a problem, since the object is now imaged in a region near the center of the wide-angle view which has low distortion and high resolution, and the "help" from the second lens view is not needed in order to be able to view the object properly.

In other words, the object can always be followed in wide-angle image as it moves through the monitored scene, and at those points in the scene where it is imaged with a lower image quality, i.e. in the periphery of the wide-angle image, the non-wide-angle image aids in giving a better image quality, allowing a security operator to identify or recognize the object more easily.

Figures 6, 7:
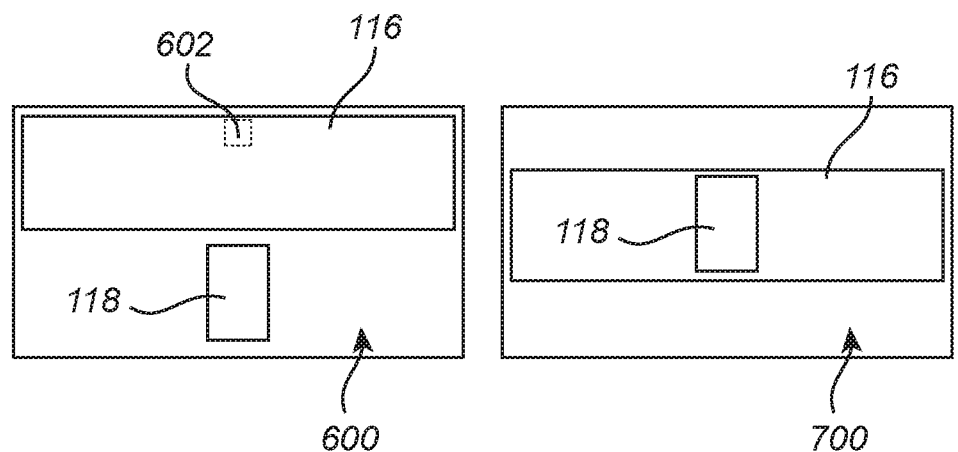
FIGS. 6-9 show various user interfaces.
Figures 8, 9:
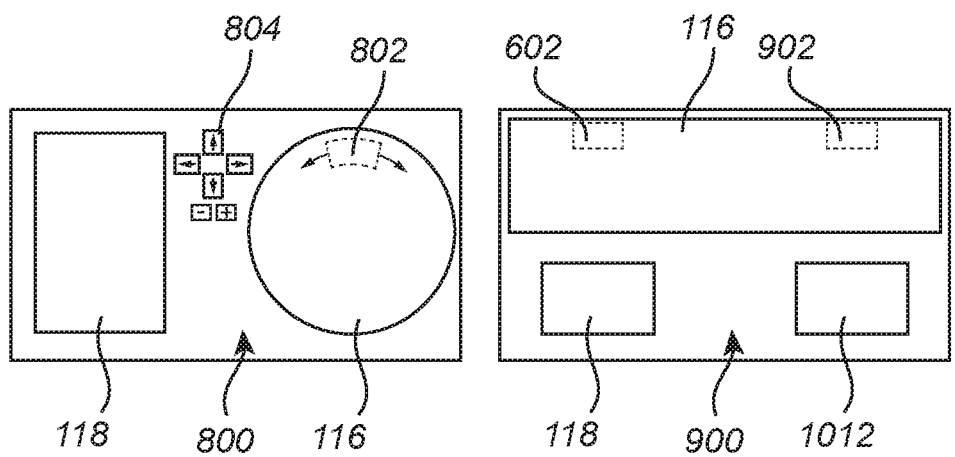

FIGS. 6-8 show different ways of visualizing the two different views which are imaged by the first and the second lens in a user interface. In FIG. 6, a user interface 600 is illustrated, where the panoramic image 116 has been transformed from a circular format into a rectangular format by any of a variety of methods known to a skilled person. Below the transformed panoramic image 116, the image 118 from the second lens is shown. An overlay 602 indicating the current position of the second lens image 118 within the panoramic image 116 is placed on the panoramic image. The indication may e.g. be in the form of a rectangle with a dotted outline. Any suitable graphical indication may of course be used, such as e.g. a shadowed or brightened overlay.

In FIG. 7 another user interface 700 is shown, where the image 118 from the second lens 104 instead is overlaid on the panoramic image 116 from the wide-angle lens 118. The panoramic image 116 has been transformed into a rectangular format in a similar manner to what is shown in FIG. 6. The image 118 may be overlaid with various degrees of transparency, or it may cover the underlying image data from the panoramic image 116 completely. The degree of transparency may e.g. be controllable by a user.

FIG. 8 shows another user interface 800. Here the circular format is used for the panoramic image 116, and the image 116 from the second lens is shown next to the panoramic image 116. Just as in the example shown in FIG. 6, an overlay 802 is placed on the panoramic image 116 to indicate the current position of the view imaged by the second lens 104 within the panoramic view imaged by the first lens 102. User controls 804 are also provided for the user to control the view direction of the second lens 104, or in other words control the rotation of the rotatable base 106 of the camera 100, in order to let the second lens 104 view different parts of the periphery of the panoramic view from the first lens 102.

Figure 10:
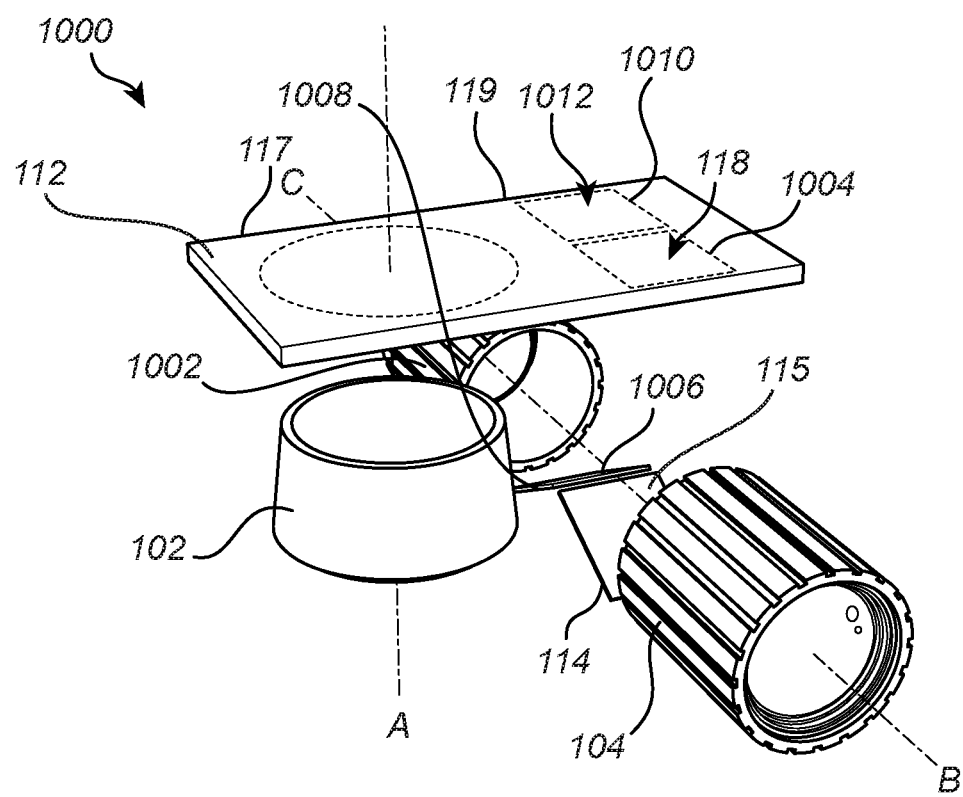
FIG. 10 shows another image capturing unit.
Figure 11:
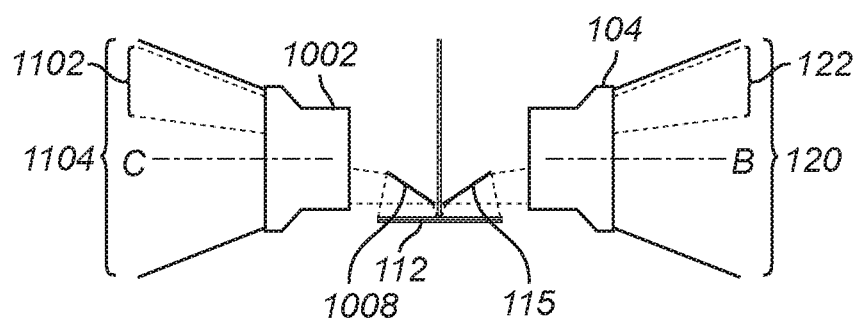
FIG. 11 shows parts of the image capturing unit in FIG. 10 in more detail.

FIGS. 9-11 illustrate a variant where an image capturing unit 1000 includes not only the first, wide-angle lens 102 and the second, non-wide-angle lens 104, but also a third, non-wide-angle lens 1002. As shown in FIGS. 10-11, the third lens 1002 is, in the same way as the second lens 104, arranged to depict a part of the periphery of the panoramic view imaged by the first lens 102. In the exemplifying embodiment shown in FIGS. 10-11, the second lens 104 and the third lens 1002 are placed on opposing sides of the image sensor 112.

The view imaged by the second lens 104 is reflected by the reflective surface 115 of the first optical element 114, onto a first part 1004 of the second end region and forms the image 118. A second optical element 1006, similar to the first optical element 114, and having a reflective surface 1008 arranged at an acute angle to the optical axis C of the third lens 1002, is also provided for reflecting the view from the third lens 1002 onto a second part 1010 of the second end region 119. The view reflected from the third lens here forms a third image 1012.

FIG. 11 illustrates more in detail how the views imaged by the second lens 104 and the third lens 1002 are reflected onto the image sensor 112 by the reflective surfaces 115 and 1008 of the optical elements 114 and 1006. As was described in connection with FIGS. 2A and 3A, the first optical element 114 with its reflective surface 115 is arranged in an acute angle to the optical axis B of the second lens 104 in such a way that a part 122 of the view 120 imaged by the second lens is reflected onto the image sensor 112. In a corresponding manner the second optical element 1006 and its reflective surface 1008 is arranged in an acute angle to the optical axis C of the third lens 1002 in such a way that a part 1102 of the view 1104 imaged by the third lens is reflected onto the image sensor 112.

FIG. 9 shows a user interface 900, where the images 118 and 1012 from the second lens 104 and the third lens 1002, are shown together with the panoramic image 116 from the first lens 102. Just as in FIG. 6, an overlay 602 is provided indicating the current position of the second lens view within the panoramic image 118. Additionally, an overlay 902 is provided which shows the current position of the third lens view within the panoramic image 118.

It may be noted that one or more of the panoramic image 116, the image 118 from the second lens and the image 1012 from the third lens may be up- or downscaled, e.g. in connection with providing those user interfaces where one image is overlaid on the other. This is useful since the non-panoramic images depict a smaller portion of the scene at approximately the same amount of image sensor pixels as are used by the panoramic image.

In summary, the present application relates to a camera where a non-wide-angle lens and a wide-angle lens projects images onto different regions of one and the same image sensor. The non-wide-angle lens images a part of a periphery of the wide-angle lens image, and in this way an overview image with an improved quality peripheral region can be achieved.

Several variations of the described embodiments are possible. As an example, the image capturing unit and the image processing unit may be arranged within one unit, or may reside at different nodes in a network. More than two non-wide-angle lenses may also be used to complement the first, wide-angle lens by providing detailed views of parts of the periphery of the overview image provided by that lens.

LIST OF REFERENCE NUMERALS

100 Camera
102 First, wide-angle lens
104 Second, non-wide-angle lens
106 Rotatable base
108 Dome window
109 Image processing unit
110 Image capturing unit
112 Image sensor
114 First optical element
115 Reflective surface
116 Wide-angle (panoramic) image from first lens
117 First end region of image sensor
118 Image from second lens
119 Second end region of image sensor
120 Second lens view
121 Light-absorbing wall
122 Part of second lens view reflected by first optical element
402 Camera housing
404 Spring-loaded clamps
500 Monitored scene
502 Object (person)
600 User interface
602 Overlay
700 User interface
800 User interface
802 Overlay (graphical indication)
804 User controls
900 User interface
902 Overlay
1000 Image capturing unit
1002 Third lens (non-wide-angle)
1004 First part of second end region
1006 Second optical element
1008 Reflective surface of second optical element
1010 Second part of second end region
1012 Image from third lens
1102 Part of third lens view reflected by second optical element
1104 Third lens view
A Optical axis of first, wide-angle lens
B Optical axis of second, non-wide-angle lens
C Optical axis of third, non-wide-angle lens

What is claimed is:

1. A monitoring camera arranged to monitor a scene, the monitoring camera comprising:
an image processing unit and an image capturing unit, wherein the image processing unit is arranged to receive images from the image capturing unit,
wherein the image capturing unit comprises
a first, wide-angle lens arranged for imaging a first, panoramic view of the scene,
a second, non-wide-angle lens, arranged for imaging a second view of the scene, wherein the second lens is mounted with its optical axis at a second angle to an optical axis of the first lens, such that the second view of the scene imaged by the second lens covers a first part of a peripheral portion of the first view,
an image sensor, arranged to capture the first view imaged by the first lens, at a first end region, and arranged to capture a portion of the second view, at a second end region, wherein the first view and the second view are captured at a substantially same time, and
a first optical element having a first reflective surface, wherein the first reflective surface is mounted at a first, acute angle to the optical axis of the second lens, and arranged to reflect the portion of the second view, and wherein the image sensor is mounted in a plane perpendicular to the optical axis of the first lens, or
wherein the first reflective surface is mounted at a first, acute angle to the optical axis of the first lens, and arranged to reflect the first view, and wherein the image sensor is mounted in a plane perpendicular to the optical axis of the second lens;
wherein when the first reflective surface is mounted at a first, acute angle to the optical axis of the second lens, and arranged to reflect the portion of the second view, and wherein the image sensor is mounted in a plane perpendicular to the optical axis of the first lens,
the monitoring camera further comprising:
a third, non-wide-angle lens, arranged for imaging a third view of the scene, and
a second optical element having a second reflective surface, wherein the second reflective surface is arranged at a third, acute angle to an optical axis of the third lens, and arranged to reflect a portion of the third view imaged by the third lens,
wherein the image sensor is arranged to capture the reflected portion of the second view image reflected by the first reflective surface, at a first part of the second end region, and to capture the reflected portion of the third view image reflected by the second reflective surface, at a second part of the second end region, and
wherein the third lens is mounted with its optical axis at a fourth angle to the optical axis of the first lens, such that the third view of the scene imaged by the third lens covers a second part of a peripheral portion of the first view imaged by the first lens.

2. The monitoring camera of claim 1, wherein the first lens is a fish-eye lens.

3. The monitoring camera of claim 1, wherein the second angle is between 30° and 95°, and in particular is 90°.

4. The monitoring camera of claim 1, wherein the first optical element comprises at least one of a mirror and a prism.

5. The monitoring camera of claim 1, wherein the first optical element is arranged to separate the first end region from the second end region of the image sensor.

6. The monitoring camera of claim 1, wherein the first optical element is arranged along a side of the image sensor.

7. The monitoring camera of claim 1, wherein the image processing unit is arranged to:
receive an image from the image sensor comprising both the first view captured from the first lens and the second view captured from the second lens, and
add an overlay, to an image part representing the first view from the first lens, marking the part of the peripheral portion of the first view which is currently covered by the second lens.

8. The monitoring camera of claim 1, wherein the image capturing unit is mounted on a rotatable base, such that the second lens is arranged to image different parts of the peripheral portion of the scene in different rotated positions of the base.

9. The monitoring camera of claim 8, wherein the image processing unit is arranged to perform a rotational transform of the image captured by the first end region of the image sensor of the view imaged by the first lens, such that a rotation of the camera is compensated.

10. The monitoring camera of claim 1, further comprising:
 a first light absorbing wall separating the first end region and the second end region of the image sensor,
 wherein the first light absorbing wall is arranged to prevent light from the second lens from falling on the first end region of the image sensor.

11. The monitoring camera of claim 1, wherein the first reflective surface is mounted at a first, acute angle to the optical axis of the second lens, and arranged to reflect the portion of the second view, and wherein the image sensor is mounted in a plane perpendicular to the optical axis of the first lens,
 the monitoring camera further comprising:
 a second light absorbing wall mounted at the first end region of the image sensor and enclosing an area of the image sensor capturing the first view imaged by the first lens,
 wherein the second light absorbing wall is arranged to prevent light from the second lens from entering the view imaged by the first lens at the image sensor.

12. The monitoring camera of claim 1, wherein the second lens and the third lens are arranged at opposing sides of the image sensor.

13. The monitoring camera of claim 1, wherein the first optical element and the second optical element are arranged between the first part and the second part of the second portion of the image sensor.

14. The monitoring camera of claim 12, wherein the first optical element and the second optical element are arranged between the first part and the second part of the second portion of the image sensor.

15. The monitoring camera of claim 1, further comprising:
 a third light absorbing wall, mounted between the first and the second part of the second portion of the image sensor, and arranged to prevent light from the second lens from entering the second part of the second portion of the image sensor, and to prevent light from the third lens from entering the first part of the second portion of the image sensor.

16. The monitoring camera of claim 12, further comprising:
 a third light absorbing wall, mounted between the first and the second part of the second portion of the image sensor, and arranged to prevent light from the second lens from entering the second part of the second portion of the image sensor, and to prevent light from the third lens from entering the first part of the second portion of the image sensor.

* * * * *